United States Patent [19]
Baughman

[11] 3,883,206
[45] May 13, 1975

[54] CENTERING AND ANCHORING DEVICE

[75] Inventor: Kenneth H. Baughman, Rome, Ga.

[73] Assignee: General Electric Company

[22] Filed: May 7, 1973

[21] Appl. No.: 357,684

[52] U.S. Cl. .................. 312/351; 312/100; 336/65; 336/92
[51] Int. Cl. .......................................... H01f 15/02
[58] Field of Search ................. 336/92, 65, 67, 90; 312/351, 352, 100; 85/1 R, 50 R; 248/274, 23, 17; 52/758 F

[56] References Cited
UNITED STATES PATENTS

| | | | |
|---|---|---|---|
| 745,531 | 12/1903 | Sholes | 85/1 R |
| 1,097,185 | 5/1914 | Oehrle | 85/1 R |
| 1,332,317 | 3/1920 | Boas | 85/50 R |
| 1,686,704 | 10/1928 | Marles | 85/50 R |
| 1,869,686 | 8/1932 | Hargreaves | 248/17 |
| 2,351,097 | 6/1944 | Boeringer | 336/92 |
| 2,598,957 | 6/1952 | Wolfe | 312/100 |
| 2,942,216 | 6/1960 | Camilli et al. | 336/92 |
| 2,952,946 | 9/1960 | Lucas | 85/1 R |
| 3,125,736 | 3/1964 | Aronson et al. | 336/92 X |
| 3,203,082 | 8/1965 | Robbins | 52/758 F |
| 3,357,661 | 12/1967 | Aakjar | 248/23 |
| 3,760,314 | 9/1973 | Krasienko | 336/92 |

FOREIGN PATENTS OR APPLICATIONS 11,722   6/1889   United Kingdom ............... 85/1 R

*Primary Examiner*—James T. McCall
*Attorney, Agent, or Firm*—Francis X. Doyle

[57] ABSTRACT

A centering and anchoring device for electrical apparatus. The wall of an enclosure has a fixed bracket member with a threaded opening while the clamping structure of an electrical apparatus is provided with an enlarged opening to substantially align with the threaded opening in the fixed bracket. A threaded bolt with a cone shaped washer fits into the enlarged opening and is threaded into the bracket. The cone shaped washer centers the electrical apparatus within the enclosure and secures it within such enclosure to the threaded bracket fixed to the wall of the enclosure.

4 Claims, 4 Drawing Figures

CENTERING AND ANCHORING DEVICE

BACKGROUND OF THE INVENTION

This invention relates to centering and securing means, and more particularly to means for centering and securing an electrical apparatus within an enclosure.

It is well known in the electrical apparatus field that enclosed electrical apparatus, such as, for example, transformers and the like, have a tendency to move or vibrate during use. Of course, during transport, problems of movement within the enclosure are also well known. Where a dielectric fluid is used, either a liquid or gaseous material, the possibility that movement of the apparatus within the enclosure could rupture such enclosure allowing leakage of the dielectric which entails both loss of insulation as well as ecology or contamination problems are also well known.

Many means have been used to secure apparatus in enclosures. However, when brackets and the like with aligned holes are used, due to tolerances in manufacture often the holes will not be properly aligned. In some instances this has led to the requirement of actually drilling of the hole after the insertion of the apparatus within the enclosure. One way to prevent lack of alignment is by use of sloped or beveled braces.

One such device is shown in U.S. Pat. No. 2,351,097. However, this type of device requires a number of parts. It requires large clamping plates and in some places close tolerances are needed to enable the clamping plate to fit snugly between the core clamping means. There is a well recognized need in the electrical art for a simple, reliable clamping device, which will be inexpensive, which will compensate for the various tolerance problems and which may be easily applied. Further, it is desirable that such clamping means be able to aid in centering the apparatus within the enclosure.

It is, therefore, a principal object of this invention to provide a novel centering and securing means.

A further object of this invention is to provide a novel securing means for an electrical apparatus which will aid in centering the apparatus within the enclosure.

A still further object of this invention is to provide a novel securing means for electrical apparatus having means cooperating with wall mounted lugs and with strap means of the apparatus to compensate for the manufacturing tolerances in the apparatus.

SUMMARY OF THE INVENTION

In carrying out this invention, the electrical apparatus enclosure is provided with at least two brackets which are fixed to the wall of the enclosure and preferably on opposite side walls of such enclosure. Each bracket is provided with a threaded opening. The electrical apparatus mounted in the enclosure is provided with a clamping structure having a bar which is dimensioned such that the ends of the bar overlie the brackets. The bar is provided with an enlarged opening at each end and a bolt means is provided for each bracket which threads into the threaded opening in the bracket. The bolt is provided with a beveled or cone shaped washer, the washer fitting within the oversized opening and aiding in centering the apparatus within the enclosure and holding the apparatus firmly against the wall mounted bracket.

The invention which is desired to be protected will be particularly pointed out and distinctly claimed in the claims appended hereto. However, it is believed that this invention and the manner in which its various objects and advantages are obtained as well as other objects and advantages thereof will be better understood by reference to the following detailed description of a preferred embodiment thereof, particularly when considered in the light of the accompanying drawings.

DESCRIPTION OF PREFERRED EMBODIMENT OF THE INVENTION

Figure 1:
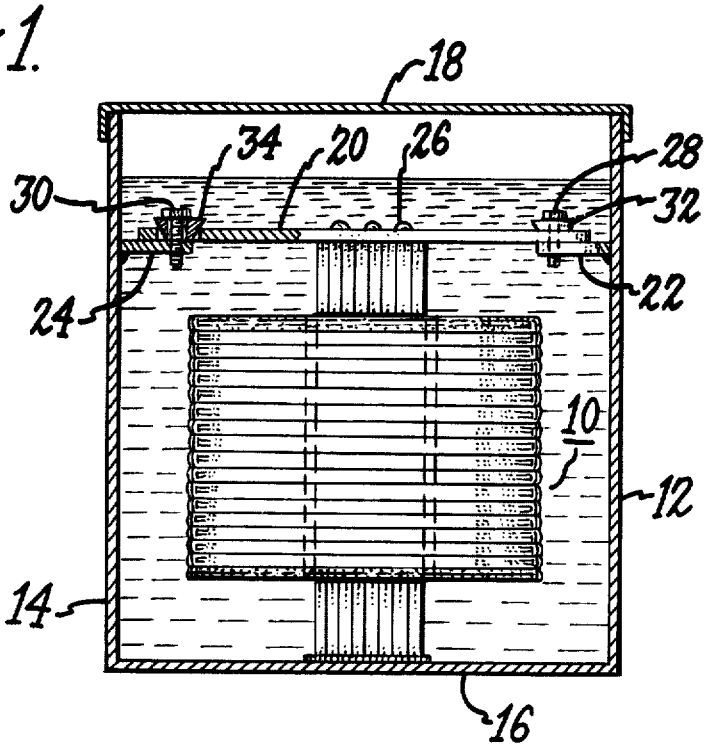
FIG. 1 is a partial sectional view of an electrical apparatus mounted within an enclosure showing a preferred form of this invention, securing the electrical apparatus within the enclosure.

As above noted, this invention relates to a centering and securing means especially adapted for use with an electrical apparatus which is mounted within an enclosure. The invention is shown in the drawings with respect to a transformer mounted within an enclosure and will be described with reference to such electrical apparatus. However, it will be understood that the centering and securing means of the invention may be used with any type of apparatus which it is desired to secure with an enclosure. Reference will now be made to the drawings in which like numerals are used to indicate like parts throughout the various views thereof.

Referring now to FIG. 1, there is shown a transformer which comprises a core and coil unit 10 which is mounted within an enclosure formed by side walls 12 and 14, bottom wall 16 and cover 18. Obviously, the enclosure may be cylindrical, or it may be rectangular having front and rear walls (not shown) or any other desired shape. The core and coil unit 10 is provided with a securing brace or bar 20 and the brace or bar 20 is firmly attached to a pair of brackets 22, 24, which are welded to opposite sides 12 and 14 of the tank or enclosure. As is shown in FIG. 1, bracket 22 is welded to wall 12 while bracket 24 is welded to wall 14. The transformer or core and coil unit 10 is secured to bar 20 by means of bolts 26 or other means as desired. In turn, the bar 20 is firmly secured to brackets 22, 24 by means of bolts 28 and 30, each bolt carrying a conical shaped washer 32, 34 as will be more clearly described hereafter.

Figure 2:
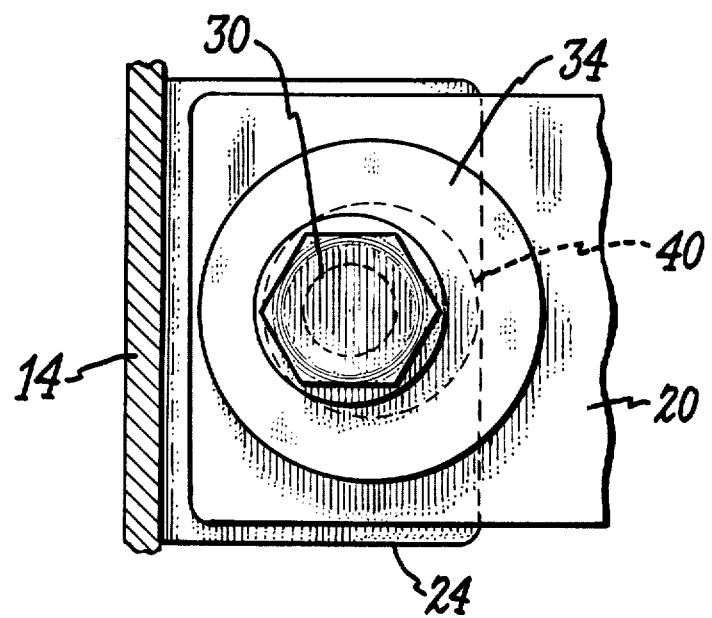
FIG. 2 is a top view on an enlarged scale showing one of the securing means of this invention.
Figure 3:
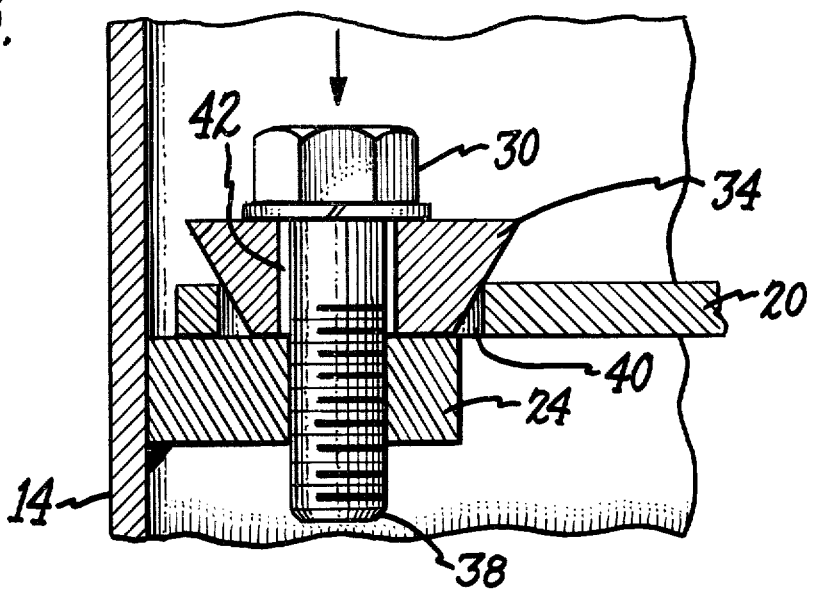
FIG. 3 is a sectional view on an enlarged scale showing the securing means in greater detail.
Figure 4:
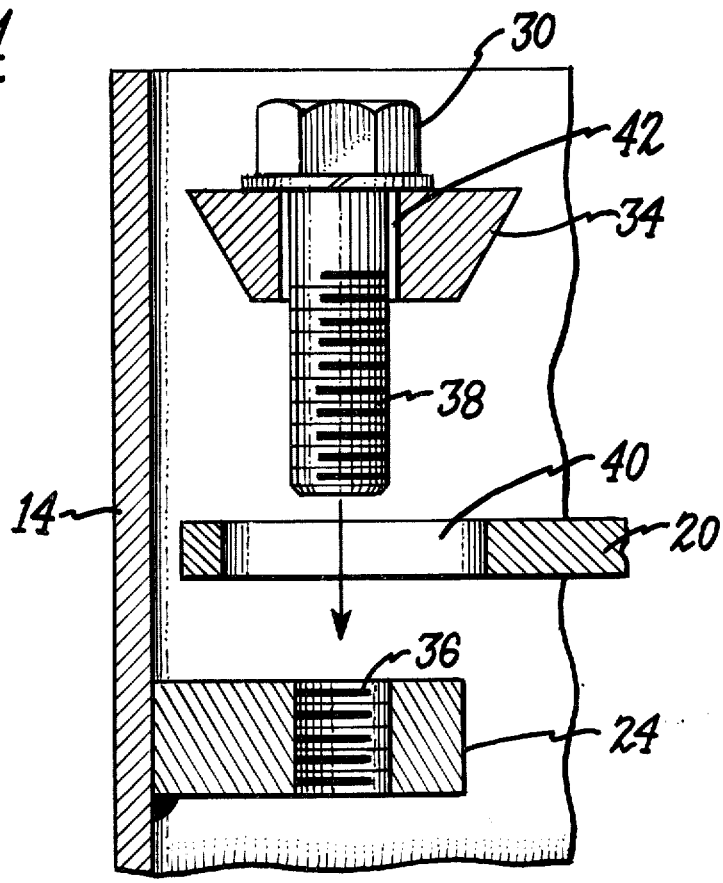
FIG. 4 is an exploded sectional view similar to FIG. 3 showing the manner in which the parts of this invention are assembled.

FIGS. 2, 3 and 4 show the bracket 24, a portion of bar 20 and the bolt 30 and washer 34 in greater detail and reference will now be made to such FIGURES. As can be seen in FIG. 4, bracket 24 is provided with a threaded opening 36 while bolt 30 is provided with a threaded portion 38 which mates with the threaded opening 36 in the manner more clearly shown in FIG. 3. The bar 20 is provided with an enlarged opening 40, at each end thereof, as is apparent from FIG. 1.

Further, as is apparent from FIG. 4, the end of securing bar 20 and the enlarged opening 40 overlie bracket 24 and the threaded opening 36. Of course, it will be understood, that the opposite side of bar 20 as it is shown in FIG. 1 has a similar opening overlying bracket 22. The bar 20 is dimensioned so that it extends from the core and coil unit 10 to overlie brackets 22 and 24 as shown. In order to secure bar 20 and thus the core and coil unit 10 to the brackets 22 and 24 and thus the enclosure, the conical washers 32, 34 are mounted on bolts 28, 30, respectively and the bolts are threaded into the threaded openings 36 of brackets 22 and 24. The conical washers 32, 34 will engage the edge of the enlarged openings 20 in the bar to firmly hold bar 20 to brackets 22, 24.

In the preferred embodiment shown in the drawings, the conical washers 32, 34 are provided with an offset or eccentric hole 42 which will aid in centering the washers 32, 34 in the enlarged openings 40 of the bar 20. As will be understood, during manufacture of the brackets 22, 24, the bar 20 and the placing of the openings 36 and 40 various tolerances are allowed. Consequently when the parts are assembled, the registration of the center line of opening 40 with the center line of opening 36 can vary by several hundredths inches. The eccentric opening 42 in conical washers 32, 34 will overcome these variations allowing the washers, 32, 34 to center in the enlarged openings 40 and substantially contact the edge of the openings 40 in the bar 20 around the entire circumference of the conical washers 32, 34.

Of course, it will be apparent to those skilled in the art that as many braces or bars 20 and fixed brackets 22, 24 will be provided as are considered necessary. In general, at least two brackets 22, 24 will be provided on opposite walls in the manner shown in FIG. 1 to prevent movement of the apparatus, such as core and coil unit 10. It will also be apparent that the conical washers 32, 34 may be provided with centered holes. However, better seating in view of manufacturing tolerances will be obtained by use of the eccentric holes.

While there has been shown and described the present preferred embodiment of this invention, it will be apparent to those skilled in the art that various changes may be made in the constructional details. For example, the bar 20 could be an extension of the core clamping means; and, of course, other types of apparatus could make use of the invention. It is to be understood that the following claims are intended to cover such variations as fall within the true spirit and scope of the invention.

What is claimed as new and which it is desired to secure by Letters Patent of the United States is:

1. A centering and anchoring device for holding an apparatus in an enclosure during use comprising an enclosure having opposed side walls, at least two brackets secured to said side walls, threaded openings in said brackets, an apparatus within said enclosure, a bar fixed to said apparatus, said bar dimensioned to overlie said brackets, said bar having enlarged openings, one said enlarged opening overlying each said threaded opening in said brackets, a bolt extending through each said enlarged opening and threaded into each said threaded opening and a conical washer mounted on each said bolt and in secure engagement with each said enlarged opening.

2. A centering and anchoring device as claimed in claim 1 in which said conical washers have an offset opening extending therethrough.

3. A centering and anchoring device for holding an apparatus in an enclosure during use comprising an enclosure having opposed side walls, at least one bracket secured to each of said side walls, a threaded opening in each said bracket, an apparatus within said enclosure, a brace fixed to said apparatus, said brace dimensioned such that one end of said brace will overlie said bracket on one of said side walls and the other end of said brace will overlie said bracket on the other of said opposed side walls, said brace having an enlarged opening at each end thereof, one said enlarged opening overlying each said threaded opening in each said bracket, a bolt extending through each said enlarged opening and threaded into each said threaded opening and a conical washer mounted on each said bolt and in secure engagement with each said enlarged opening.

4. A centering and anchoring device as claimed in claim 3 in which said conical washers have an offset opening extending therethrough.

* * * * *